US007305552B2

(12) United States Patent
Ruetschi et al.

(10) Patent No.: US 7,305,552 B2
(45) Date of Patent: Dec. 4, 2007

(54) SCREEN SAVER DISPLAYING IDENTITY CONTENT

(75) Inventors: Johannes Ruetschi, Boca Raton, FL (US); Jeffrey Blohm, Menlo Park, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 762 days.

(21) Appl. No.: 10/723,338

(22) Filed: Nov. 26, 2003

(65) Prior Publication Data

US 2005/0114503 A1 May 26, 2005

(51) Int. Cl.
*G06F 1/24* (2006.01)
(52) U.S. Cl. .............. 713/164; 713/165; 713/166; 713/168; 713/178
(58) Field of Classification Search .......... 713/164, 713/165, 166, 168, 178
See application file for complete search history.

(56) References Cited

U.S. PATENT DOCUMENTS 5,550,984 A * 8/1996 Gelb ................ 709/245
5,615,127 A * 3/1997 Beatty et al. ............ 716/7
5,666,484 A * 9/1997 Orimo et al. ............ 714/18
6,507,351 B1 1/2003 Bixler .................. 345/810
2002/0196280 A1 12/2002 Bassett et al. ........... 345/751
2002/0196294 A1 12/2002 Sesek .................... 345/867

FOREIGN PATENT DOCUMENTS

EP 0 950 956 10/1999

OTHER PUBLICATIONS

International Business Machines Corporation: "Diary as screen saver", Research Disclosure, Kenneth Mason Publications, Hampshire, GB, vol. 451, No. 119, Nov. 2001.

* cited by examiner

*Primary Examiner*—Thomas R. Peeso

(57) ABSTRACT

A real-time communications system of networked communications devices, method and program product for operating such a system. A screensaver resides on at least one of the communications devices, that selectively displays status information on a corresponding identified user. Presence and availability information about the particular system user is stored on a central storage and provided to the screensaver for display. Information on the screensaver apprises viewers of current user presence and availability status.

26 Claims, 2 Drawing Sheets

SCREEN SAVER DISPLAYING IDENTITY CONTENT

BACKGROUND OF THE INVENTION

1. Field of the Invention

The present invention is related to a real time multi-platform communications system and more particularly to an integrated real time presence and availability based multi-platform communications system wherein groups of user maintain intra-group communications.

2. Background Description

Personal productivity applications or tools are well known and readily available for everyday use. Examples of such personal productivity tools include state of the art communications tools such as instant messaging applications and e-mail, as well as personal information manager (PIM) software. These personal productivity tools are available as individual stand alone applications (e.g., America Online (AOL) Instant Messenger (AIM) from AOL, Eudora from Qualcomm Inc., and Palm Desktop from Palm, Inc.) or, integrated in a single office suite, e.g., Microsoft (MS) Outlook in MS Office from Microsoft Corporation. Further, personal productivity tools are available for a wide range of platforms, ranging from small hand held devices such as what are known as personal digital assistants (PDAs) and web enabled or third generation (3G) cell phones to larger personal computers (PC) and even to distributed or Internet based platforms.

Recently, full featured multi-platform communications applications, such as OpenScape from Siemens Information and Communications Networks, Inc., have integrated and adapted such personal productivity tools, including both voice and text based communications applications, into a single seamless collaborative workplace communications portal. These multi-platform communications applications tie together phone, voice mail, e-mail, text messaging, calendaring, instant messaging, and conferencing services allowing user groups to communicate and collaborate more efficiently. Dispersed workgroup members or application users can communicate with one another without being constrained by geography, office location, or time zone. These multi-platform communications applications streamline business communications and improve user productivity, allowing workgroup members or users to minimize time wasted, e.g., by reducing or eliminating time spent playing phone tag. As a result, an enterprise employing such a multi-platform communications application can realize significant cost savings by reducing wasted employee time.

Thus, there is a need for a way to notify business associates of availability status, automatically and in real time.

SUMMARY OF THE INVENTION

It is a purpose of the invention to reduce employee time wasted trying to contact unavailable business associates;

It is another purpose of the invention to simplify providing up to date availability status, automatically and in real time.

The present invention relates to a real-time communications system of networked communications devices, method and program product for operating such a system. A screensaver resides on at least one of the communications devices, that selectively displays status information on a corresponding identified user. Presence and availability information about the particular system user is stored on a central storage and provided to the screensaver for display. Information on the screensaver apprises viewers of current user presence and availability status.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1:
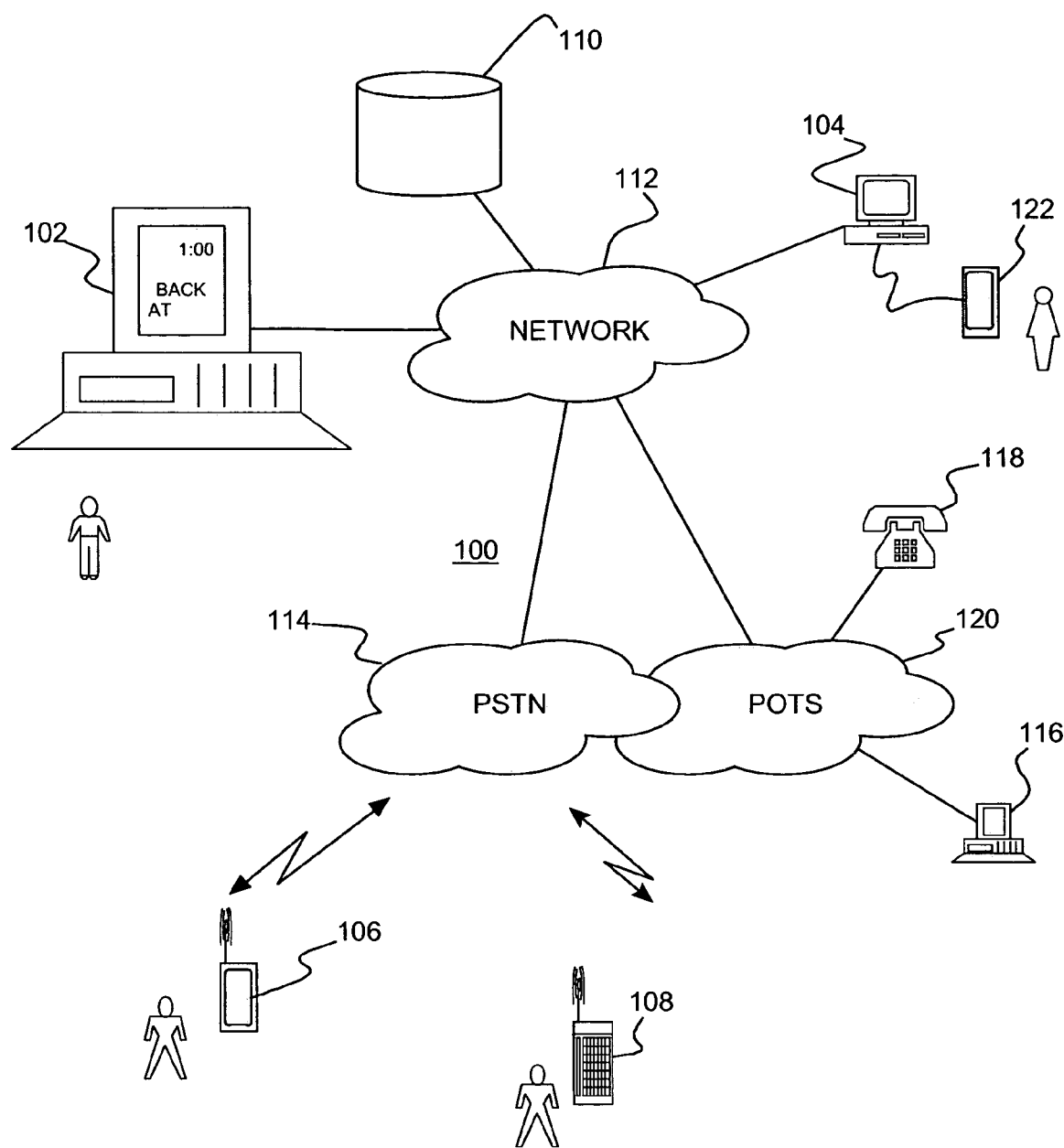
FIG. 1 shows an example of a preferred embodiment real-time multi-platform communications system according to the present invention.

Turning now to the drawings and, more particularly, FIG. 1 shows an example of a preferred embodiment real-time multi-platform communications system 100 with a presence and availability capability, such as OpenScape from Siemens Information and Communications Networks, Inc. See generally, *OpenScape V1.0, Technical White Paper*, Siemens Information and Communications Networks, Inc., 2003. The real-time multi-platform communications or user presence based system 100 serves users connected on communications devices 102, 104, 106, 108 that may be distributed over a wide geographic area. Communications devices 102 and 104 connect to a central storage 110 over a network 112 that may be a local area network (LAN), the Internet or a combination thereof. Wireless communications devices 106 and 108 connect over a public switched telephone network (PSTN) 114 to network 112. The central storage 110 may be in a server or mainframe computer operating as a presence and availability capable system. At least one communications device, e.g., a personal computer 102, includes a user-aware screensaver that retrieves and displays user specific availability information upon becoming active, e.g., after a time out for lack of system activity.

Remote or teleworking workgroup members may connect, e.g., from home computer or terminal 116 or by telephone 118 over a typical telephone network 120, e.g., the plain old telephone system (POTS). Distributed communications devices may include one or more personal computers 102, computer terminals 104 and a connected personal digital assistant (PDA) 122 and/or wireless devices such as a wireless capable PDA 106 or a cell phone 108 with text capability. Further, personal computers 102 may include any number of suitable such general purpose stand alone computers, such as, for example, desktop computers, notebook computers, tablet computers and the like. Examples of wireless capability may include a wireless LAN (WLAN) or a Wi-Fi connection such as an IEEE 802.11a or 802.11b adapter, a cell phone capability or card or, Bluetooth connection adapter. The central storage 110 stores workgroup user (e.g., employee) related personal information, e.g., calendar data, contact data or any data that might be found in a personal information manager (PIM) application. Also, the central storage 110 includes workgroup information, e.g., listing individual users and assigning listed users to specific workgroups.

Typically, the presence and availability information such as stored personal information is selectively shared amongst members of a particular workgroup. The user availability data may be loaded into the central data repository 110 from any of the communications devices 102, 104, 106, 108, even at a remote location using any suitable method. Any suitable one of the communications devices 102, 104, 106, 108 may be running a user-aware screensaver. The user-aware screensaver remains dormant until after a selected activity time out, when the user-aware screensaver retrieves presence and availability information for a designated device user displays the retrieved information. Also, as it is running the user-aware screensaver may periodically retrieve updated information and update what is displayed. Anyone viewing the user-aware screensaver is quickly informed of the user's availability and receives updates in real time. Similarly, for example, a user-aware screensaver may be active on the central repository 110, e.g., providing operator availability status for anyone passing by or in the vicinity of the repository monitor (not shown).

So, for example, a teleworking employee may enter data at home from a wireless PDA 106 or home terminal 116. In another example, a traveler may enter, schedule updates from a cell phone 108 in an airport. In yet another example, the computer running the user aware screensaver may be in an office in one building and data updates may be done in another campus building or at another site, such as for simply by syncing a PDA 122 at a remote terminal to upload new or changed data. Upon retrieval of user information, the user-aware screensaver displays user presence/availability status.

On any particular system 102, the user-aware screensaver interfaces through a corresponding system or user policy within the presence and availability capable system. The user identifies identity states for display by the user-aware screensaver in the particular system or user policy. OpenScape, for example, includes a context manager that provides user presence/availability states indicating users status that the user-aware screensaver may display. For example, the user-aware screensaver may display: "In a meeting from 12:00 to 12:30," "Out to Lunch," "On Vacation from Jan. 1, 2004 to Jan. 1, 2005," "Working from Home," "In a Meeting, Available for IM Communications," "Working Remotely, available for Telephone Communications," "On a Business Trip, Periodically Checking e-mail" or, anything the user may have designated.

Each policy assigns a "host name" to the user such that, when the user-aware screensaver starts, it fetches correct user availability from the presence and availability capable system. In addition, the policy may indicate to the context manager what presence information is displayed and how it is to be displayed. A what policy filter may be employed within the presence and availability capable system to prevent accidentally displaying sensitive information, thereby, inadvertently disclosing such sensitive information to any casual passers-by, e.g., on-site vendors. A how policy may be employed to allow the user to specify how the user-aware screensaver presents the user status information, e.g., overlaid on another screensaver or, presented simply as text message streaming across the screen. However, what presence and availability information is actually displayed depends upon the type of information each individual user stores and, how that information is published by the specific presence based solutions, i.e., whether OpenScape, Microsoft Live Communications from Microsoft Corporation or, IBM Sametime from IBM Corporation, for example.

Figure 2:
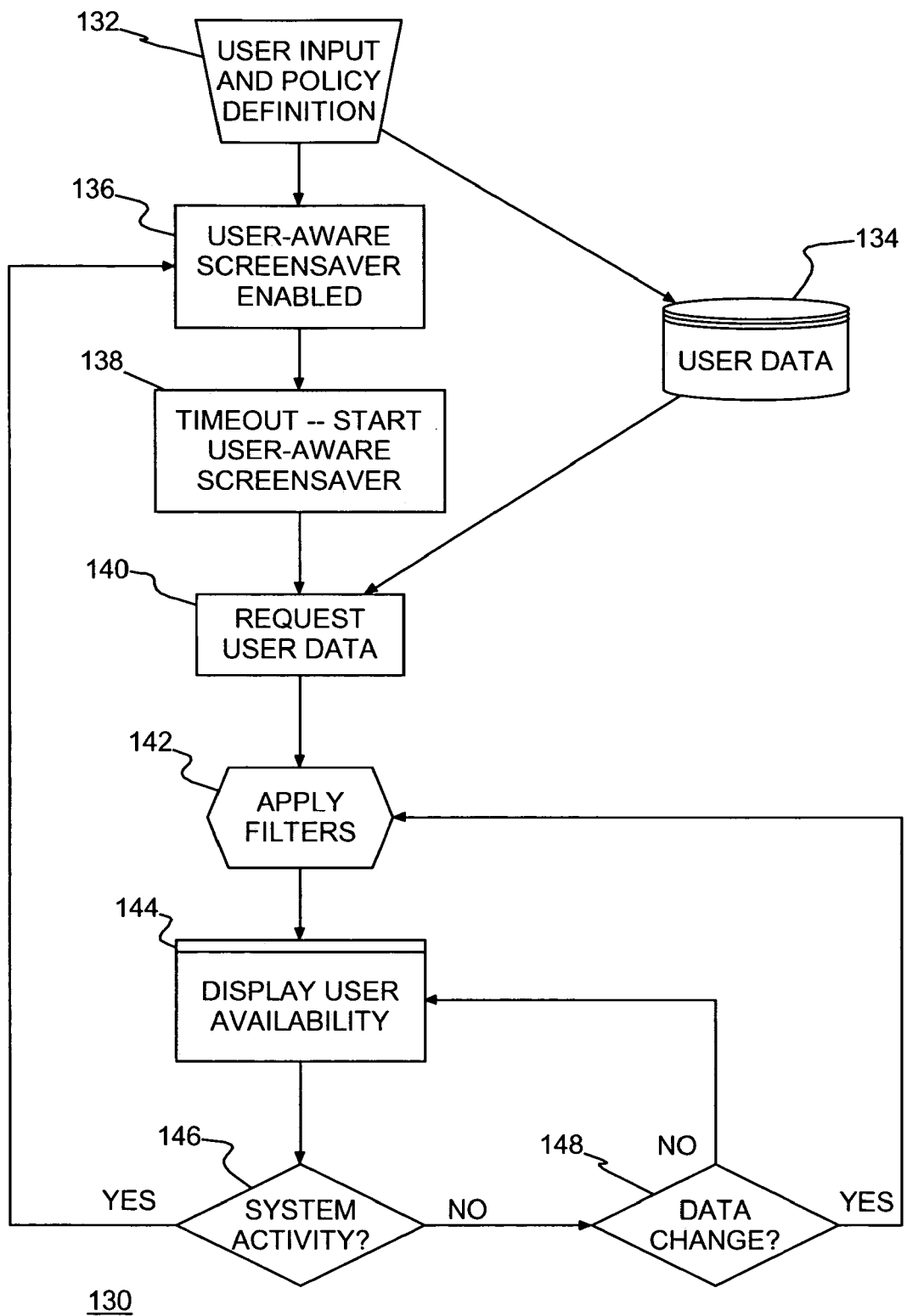
FIG. 2 shows a flow diagram of an example of operation of a preferred embodiment user-aware screensaver in a presence availability system.

FIG. 2 shows a flow diagram of an example of operation 130 of a preferred embodiment user-aware screensaver. First, a system user enters presence and availability data 132, e.g., uploaded from a PDA, which is centrally stored in 134. The context manager, guided by a previously defined system or user policy, selects identity states or a context for the user for display. Coincidentally, the user enables the user-aware screensaver in step 136, e.g., through a typical desktop properties menu, through an option in a local graphical user interface (GUI) to the presence and availability capable system or, simply, by powering up the computer with the user-aware screensaver enabled. After a timeout period (which may be designated in step 136 when the user-aware screensaver is enabled) with no activity, the user-aware screensaver starts in step 138. In step 140 the user-aware screensaver requests user data from the presence and availability capable system. In step 142 the context manager applies the system/context filters defined in step 132 to the user data to determine what is to be displayed and how. The presence and availability capable system returns the filtered data and in step 144 the user-aware screensaver displays the filtered user data. Thereafter, the screensaver checks for other system activity 146, i.e., activity to terminate the user-aware screensaver and, if no activity has occurred, checks for updates in step 148. If the system state remains unchanged, i.e., no system activity and no filtered data updates, then the user-aware screensaver continues to display the filtered user data in step 144. If, however, an update is available, the updated data is filtered in step 142 and displayed in step 144. Updates may result, for example, from the expiration of an event, passage of a scheduled end time, receipt of a flag from the central storage indicating a change or, periodic updates may be scheduled to refresh the display based on stored user data, regardless of whether any changes have been made to the stored data. As with any typical state of the art screensaver, system activity in step 146 interrupts the screensaver and returns the desktop to its normal active state.

Advantageously, the present invention allows group members to keep others abreast of their whereabouts, while preventing inadvertently exposing sensitive such information to unauthorized personnel.

While the invention has been described in terms of preferred embodiments, those skilled in the art will recognize that the invention can be practiced with modification within the spirit and scope of the appended claims.

What is claimed is:

1. A real-time communications system comprising:
   a plurality of communications devices communicating with each other over a network;
   a central storage on said network storing presence and availability information about system users, each of said plurality of communications devices being identifiable with one or more of said system users; and
   a screensaver on at least one of said communications devices, said screensaver selectively displaying status information on a corresponding identified user, said status information being filtered from said presence and availability information, whereby said screensaver apprises viewers of current status of said corresponding identified user.

2. A real-time communications system as in claim 1, wherein said presence and availability information includes one or more policies identifying identity states for display by said screensaver.

3. A real-time communications system as in claim 1, wherein said one or more policies assign a host name identifying status information in said central storage with said corresponding identified user.

4. A real-time communications system as in claim 1 further comprising a presence and availability system, said presence and availability system filtering said presence and availability information with said one or more policies and providing said status information to said screensaver.

5. A real-time communications system as in claim 4, wherein said presence and availability system periodically provides status updates to said screensaver.

6. A real-time communications system as in claim 4, wherein said screensaver periodically requests status updates from said presence and availability system.

7. A real-time communications system as in claim 4, wherein said central storage is in said presence and availability system.

8. A real-time communications system as in claim 1, wherein said at least one of said communications devices is a personal computer displaying said screensaver, said screensaver running on said personal computer.

9. A real-time communications system as in claim 1, at least one other of said communications devices receives user presence and availability input and provides received said presence and availability input to said central storage.

10. A real-time communications system as in claim 1, wherein said network is the Internet.

11. A method of automatically displaying real time status on communications devices networked together in a real-time communications system, said method comprising the steps of:
   a) enabling a screensaver;
   b) requesting current status, said current status being information on a corresponding identified user;
   c) passing said current status to said screensaver; and
   d) displaying said current status in said screensaver on a local display.

12. A method as in claim 11, wherein said local display is a display for one of said distributed communications devices and said method further comprises monitoring said one for system activity.

13. A method as in claim 11, wherein passing current status information comprises filtering centrally stored presence and availability data, filtered said presence and availability data indicating current status for a user identified with said local display.

14. A method as in claim 13, wherein said filters select what information is provided as said status information.

15. A method as in claim 13, wherein said filters select how said status information is displayed by said screensaver.

16. A computer program product for automatically displaying real time status on communications devices networked together in a real-time communications system, said computer program product comprising a computer usable medium having computer readable program code thereon, said computer readable program code comprising:
   computer program code means for a screensaver, said screensaver monitoring computer activity on a local computer and locally displaying information responsive to an activity time out;
   computer program code means for requesting current status information on a corresponding identified user for display by said screensaver; and
   computer program code means for receiving remotely stored information provided responsive to a request for said information for display.

17. A computer program product for automatically displaying real time status as in claim 16, further comprising computer program code means for periodically updating locally displayed information.

18. A computer program product for automatically displaying real time status as in claim 16, wherein said computer program code means for requesting information, requests information responsive to an update event.

19. A computer-readable medium having stored thereon a plurality of instructions, the plurality of instructions including instructions which, when executed by a processor, cause the processor to:
   a) selectively display a screensaver on a local display, said screensaver displaying local user status information;
   b) receive requests for current status, current status requests originating from said screensaver and from communications devices networked together in a real-time communications system;
   c) filter user presence and availability information, filtered said user presence and availability information being current status for a respective user;
   d) pass said current status to a respective one of said communications devices for display on a local said screensaver; and
   e) display corresponding said current status in said screensaver.

20. A computer-readable medium as in claim 19, wherein the step (c) filters said user presence and availability information indicates what said screensaver displays and indicates how said status is displayed by said screensaver.

21. A method of automatically displaying real time status on communications devices networked together in a real-time communications system, said method comprising the steps of:
   a) enabling a screensaver on one of said distributed communications devices;
   b) monitoring said one for system activity; and upon a system activity timeout
   c) requesting current status;
   d) passing said current status to said screensaver; and
   e) displaying said current status in said screensaver on a local display on said one.

22. A method as in claim 21, wherein said local display is a display for one of said communications devices and said method further comprises periodically returning to step (b).

23. A method as in claim 22, wherein a period is set in said screensaver for periodically returning to step (b).

24. A method as in claim 21, wherein said local display is a display for one of said communications devices and said method further comprises returning to step (b) responsive to an update indication from a presence and availability system.

25. A computer program product for automatically displaying real time status on communications devices networked together in a real-time communications system, said computer program product comprising a computer usable medium having computer readable program code thereon, said computer readable program code comprising:

computer program code means for a screensaver, said screensaver monitoring computer activity on a local computer and locally displaying information responsive to an activity time out;

computer program code means for requesting information for display by said screensaver, said information being requested responsive to an update event, wherein computer program code means for requesting information recognizes said update event as being one of an activity timeout, passage of a scheduled period, expiration of an event and receipt of an update flag from a presence and availability system; and computer program code means for receiving remotely stored information provided responsive to a request for said information for display.

26. A computer-readable medium having stored thereon a plurality of instructions, the plurality of instructions including instructions which, when executed by a processor, cause the processor to:

a) selectively display a screensaver on a local display, said screensaver displaying local user status information;

b) receive requests for current status, current status requests originating from said screensaver and from communications devices networked together in a real-time communications system;

c) filter user presence and availability information, filtered said user presence and availability information being current status for a respective user;

d) pass said current status to a respective one of said communications devices for display on a local said screensaver, wherein the current status passed in step (d) is selected from the group of text messages including:

In a meeting from a meeting start time to a meeting stop time,

Out to Lunch,

On Vacation from a vacation start time to a vacation stop time,

Working from Home,

In a Meeting, Available for IM Communications,

Working Remotely, available for Telephone Communications, and

On a Business Trip, Periodically Checking e-mail; and e) display corresponding said current status in said screensaver.

* * * * *